United States Patent
Meyer

(10) Patent No.: US 7,320,197 B2
(45) Date of Patent: Jan. 22, 2008

(54) FLOATING GARDEN DEVICE

(76) Inventor: Brian Meyer, 11068 Sand Run Rd., Harrison, OH (US) 45030

( * ) Notice: Subject to any disclaimer, the term of this patent is extended or adjusted under 35 U.S.C. 154(b) by 373 days.

(21) Appl. No.: 11/188,834

(22) Filed: Jul. 25, 2005

(65) Prior Publication Data
US 2007/0017153 A1   Jan. 25, 2007

(51) Int. Cl.
A01G 31/00   (2006.01)
(52) U.S. Cl. ..................................... 47/59 R
(58) Field of Classification Search ............ 47/63, 47/65.5, 87, 81, 80
See application file for complete search history.

(56) References Cited

U.S. PATENT DOCUMENTS

| | | | |
|---|---|---|---|
| 2,531,562 A * | 11/1950 | Eve ............................... | 47/80 |
| 2,706,630 A * | 4/1955 | Cisne ........................... | 472/13 |
| 3,898,766 A * | 8/1975 | Goldstaub ...................... | 47/81 |
| 4,037,360 A | 7/1977 | Farnsworth | |
| 4,513,533 A | 4/1985 | Gething et al. | |
| 5,345,712 A * | 9/1994 | Lambert ........................ | 47/39 |
| 5,799,440 A | 9/1998 | Ishikawa et al. | |
| 5,836,108 A | 11/1998 | Scheuer | |
| 6,014,838 A | 1/2000 | Asher | |
| 6,025,042 A | 2/2000 | Kligman et al. | |
| 6,086,755 A | 7/2000 | Tepper | |
| 6,557,297 B2 | 5/2003 | Receveur | |
| 6,751,903 B2 | 6/2004 | Shryock | |
| 6,786,002 B2 | 9/2004 | Prescott | |
| 6,843,021 B1 * | 1/2005 | Huang ........................... | 47/63 |
| 6,918,206 B2 * | 7/2005 | Schuck ....................... | 47/65.5 |
| 2003/0208954 A1 * | 11/2003 | Bulk ............................. | 47/39 |
| 2007/0017153 A1 * | 1/2007 | Meyer ........................... | 47/87 |

* cited by examiner

Primary Examiner—Francis T. Palo
(74) Attorney, Agent, or Firm—Gallagher & Dawsey Co. LPA; Michael J. Gallagher; David J. Dawsey

(57) ABSTRACT

A floating garden device for displaying and watering at least one living plant as the garden floats on a body of water. The device is composed of a buoyant body and at least one plant mounting recess attached to the buoyant body. The recess is comprised of a sidewall and a bottom. The bottom is positioned in a non-horizontal orientation, generally forming an angle between five degrees and forty-five degrees. The recess is located such that only a portion of the bottom is in fluid communication with the water, thus not submerging the entire bottom. The garden device may have at least one fluid passageway extending through the mounting recess bottom such that the water may fill the submerged portion of the mounting recess, or it may have a wicking device attached to the recess bottom such that the wicking device extends into the water.

20 Claims, 6 Drawing Sheets

FLOATING GARDEN DEVICE

TECHNICAL FIELD

The present invention relates to the field of floating plant displays, in particular, to a floating garden device that controls the amount of water that is accessible to the plants on display via the fluid communication between a body of water and a recess that holds each plant.

BACKGROUND OF THE INVENTION

Numerous patents have been issued for rafts intended for hydroponics and floats intended to display plants. Generally the hydroponic rafts are designed to keep the plants out of the water while encouraging the roots to extend into the body of water. Unfortunately, display floats have lacked the ability to ensure that the plants are not over watered or to ensure that the associated potting soil does not become water logged.

For instance, U.S. Pat. No. 2,531,562 ('562) titled "Floating Support for Growing Plants" illustrates an early display float that entirely submerges the bottom of the plant pot. In fact, the '562 invention provides a "means for constantly supplying moisture to the plants," while acknowledging that "there are certain types of plants that cannot flourish when subjected to a constant water supply." Similarly, U.S. Pat. No. 4,513,533 ('533) titled "Method and Apparatus for Hydroponic Farming" illustrates a hydroponic raft that also entirely submerges the bottom of the plant container, while allowing the roots to extend into the body of water.

Maintaining the bottom of the plant pot submerged, and therefore keeping a large portion of the potting soil totally saturated, as found in the '562 and '533 devices is not healthy for many plant species. The present invention solves this issue.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

The present invention is a floating garden device for displaying and watering at least one living plant as the garden floats on a body of water. The floating garden device is composed of a buoyant body and at least one plant mounting recess attached to the buoyant body. The buoyant body has a fluid contact portion, in contact with the body of water, and an atmospheric contact portion, not in contact with the body of water.

The plant mounting recess is comprised of a sidewall and a bottom. The bottom is positioned in a non-horizontal fashion, generally forming an angle between approximately five degrees and approximately forty-five degrees with the surface of the body of water. Further, the plant mounting recess is located such that only a portion of the bottom is in fluid communication with the surface of the body of water, thus not submerging the entire bottom. In one embodiment, the garden device has at least one fluid passageway extending through the mounting recess bottom such that the body of water may fill the submerged portion of the mounting recess. Alternatively, the garden device may have a wicking device attached to the mounting recess bottom such that the wicking device extends into the body of water and facilitates fluid communication between a portion of the mounting recess bottom and the body of water.

These variations, modifications, alternatives, and alterations of the various preferred embodiments may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

Also, in the various figures and drawings, the following reference symbols and letters are used to identify the various elements described herein below in connection with the several figures and illustrations: A, B, W, and WS.

DETAILED DESCRIPTION OF THE INVENTION

The floating garden device (10) of the instant invention enables a significant advance in the state of the art. The preferred embodiments of the device (10) accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
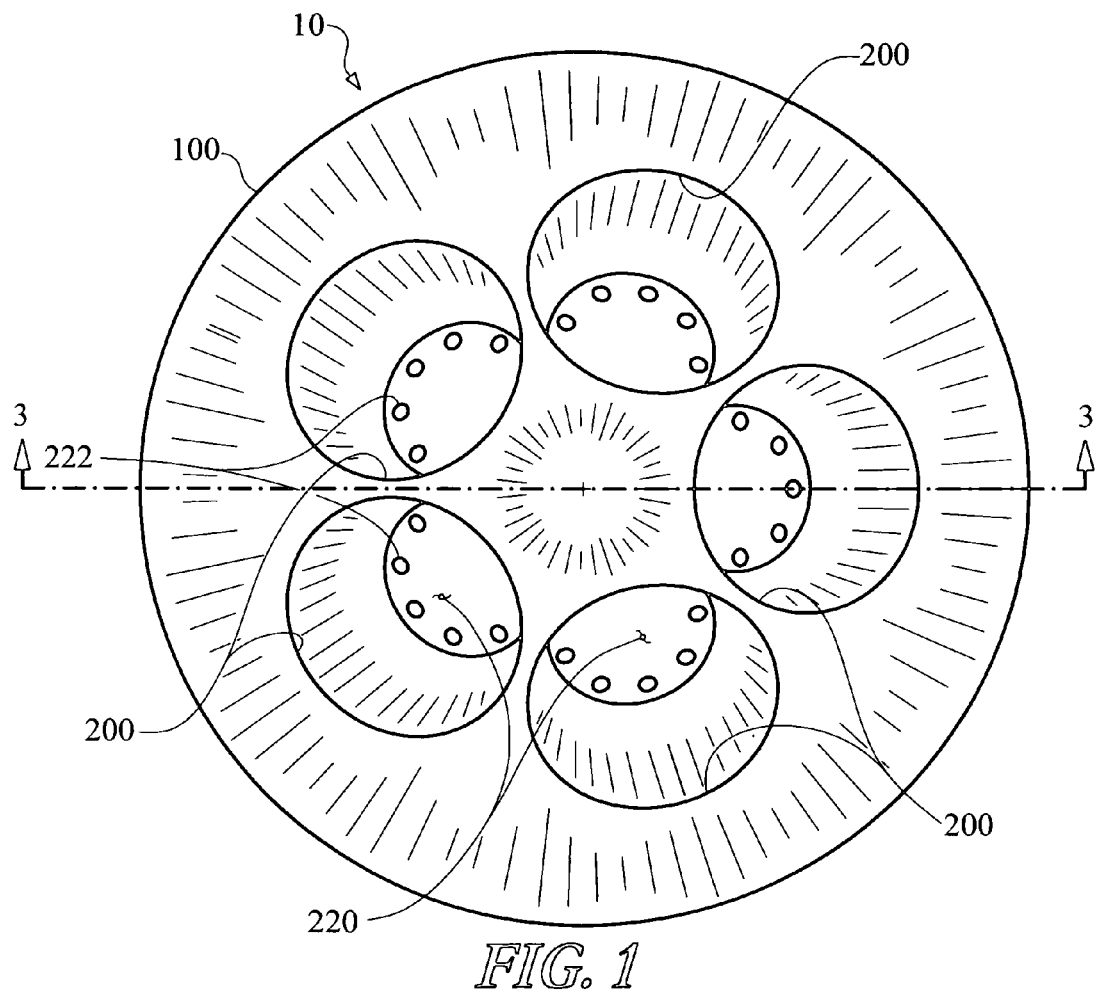
FIG. 1 shows a top plan view of the present invention, not to scale.
Figure 2:
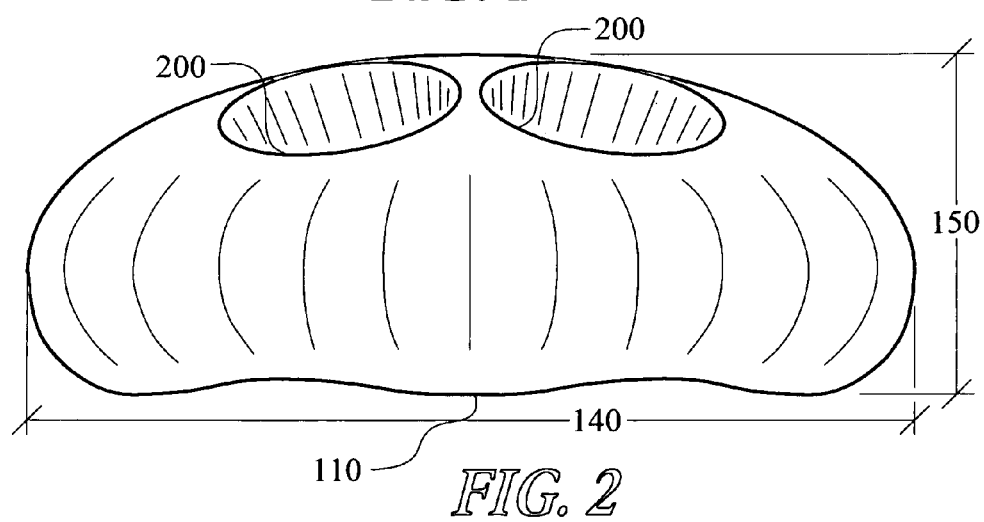
FIG. 2 shows a side elevation view of the present invention, not to scale.
Figure 3:
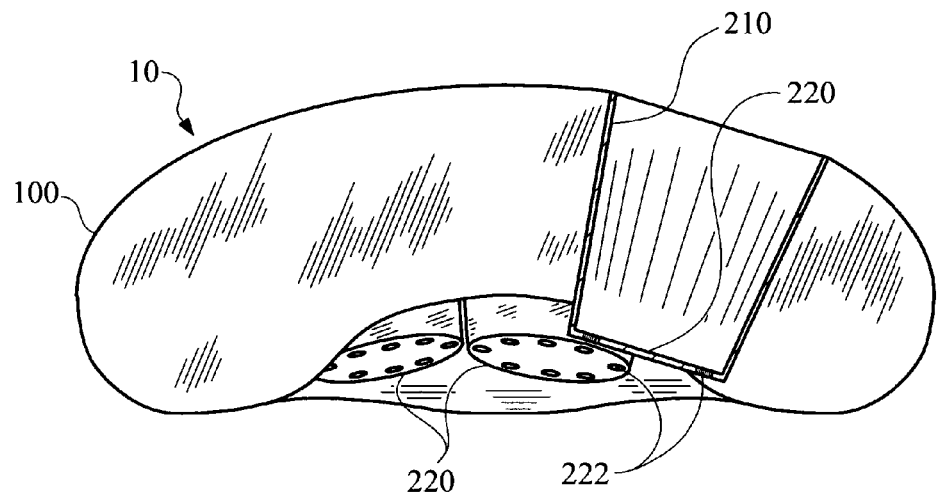
FIG. 3 shows one embodiment of a cross-section view of the present invention taken along section line 3-3 in FIG. 1, not to scale.
Figure 4:
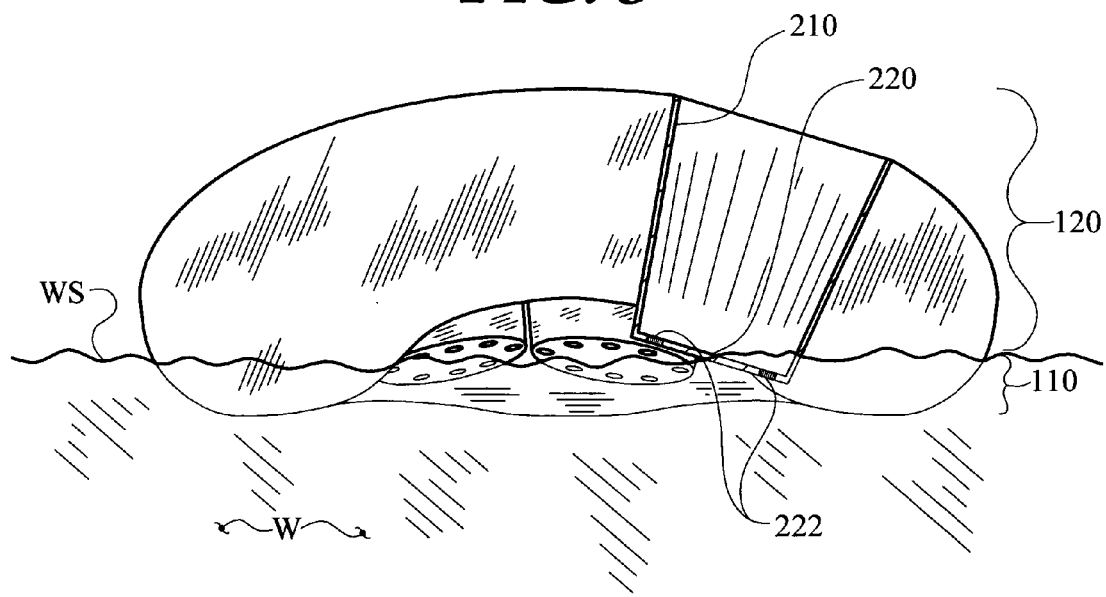
FIG. 4 shows one embodiment of a cross-section view of the present invention, floating in a body of water, taken along section line 3-3 in FIG. 1, not to scale.

The present invention is a floating garden device (10) for displaying and watering at least one living plant as the garden (10) floats on a body of water (W), as seen in FIGS. 1-10. The floating garden device (10) is composed of a buoyant body (100) and at least one plant mounting recess (200) attached to the buoyant body (100), as seen in FIGS. 1-9. The buoyant body (100) has a fluid contact portion (110), in contact with the body of water (W), and an atmospheric contact portion (120), not in contact with the body of water (W), as seen in FIG. 4. In addition, the buoyant body (100) has a maximum width (140) and a maximum height (150), as seen in FIG. 2.

Figure 8:
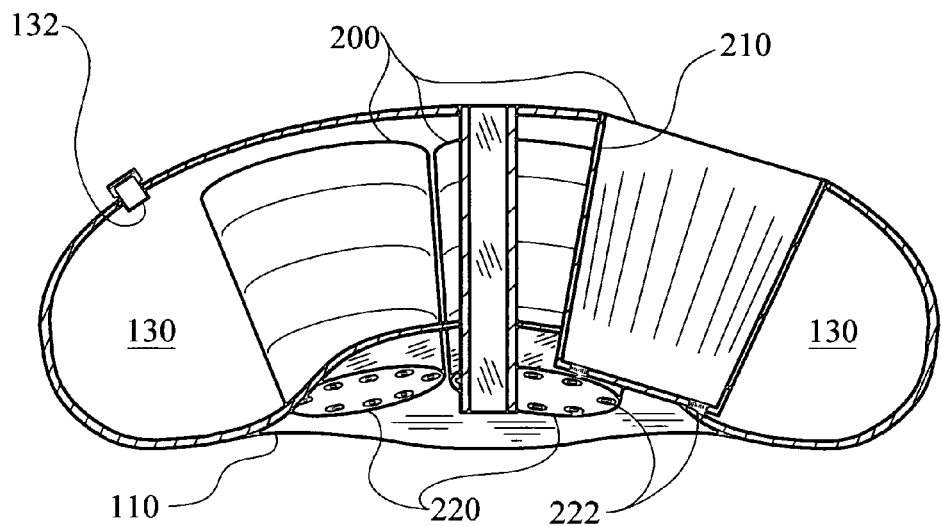
FIG. 8 shows one embodiment of a cross-section view of the present invention taken along section line 7-7 in FIG. 6, not to scale.
Figure 9:
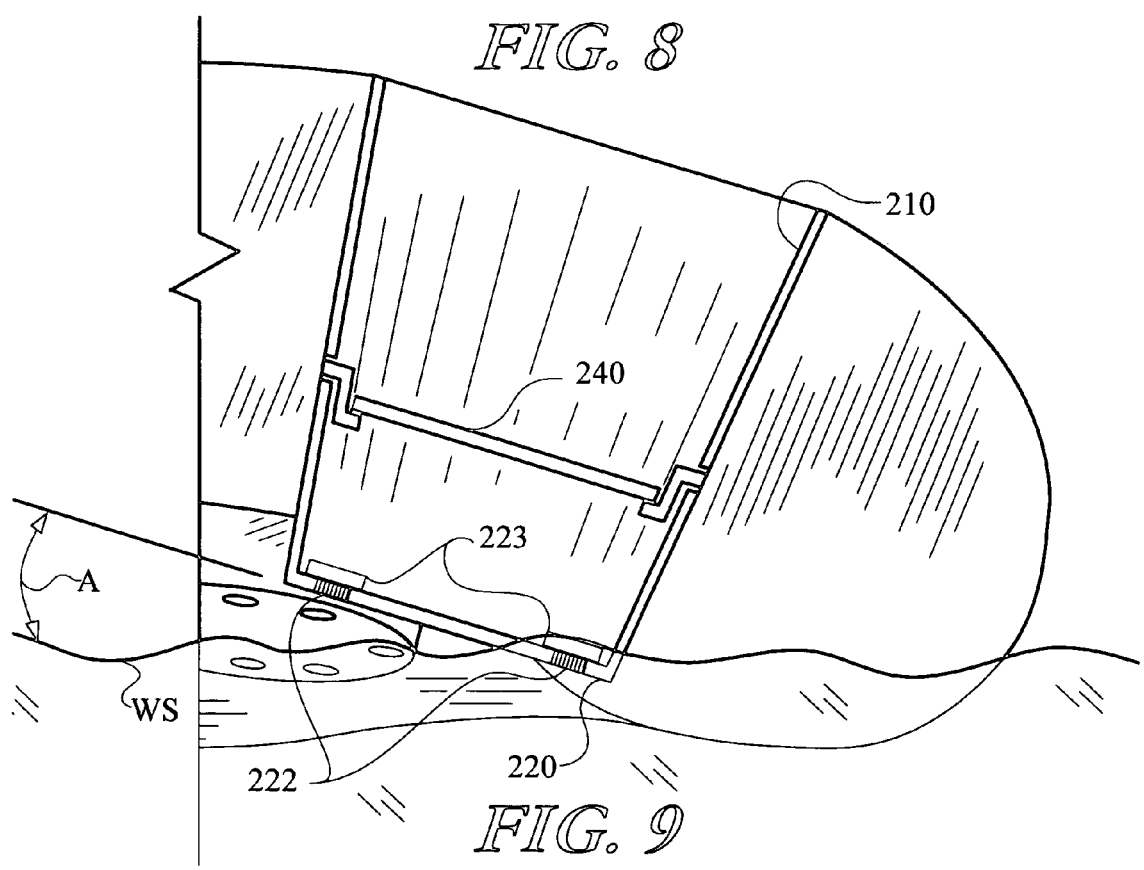
FIG. 9 shows an enlarged partial cross-section view of a plant mounting recess of the present invention, not to scale.
Figure 10:
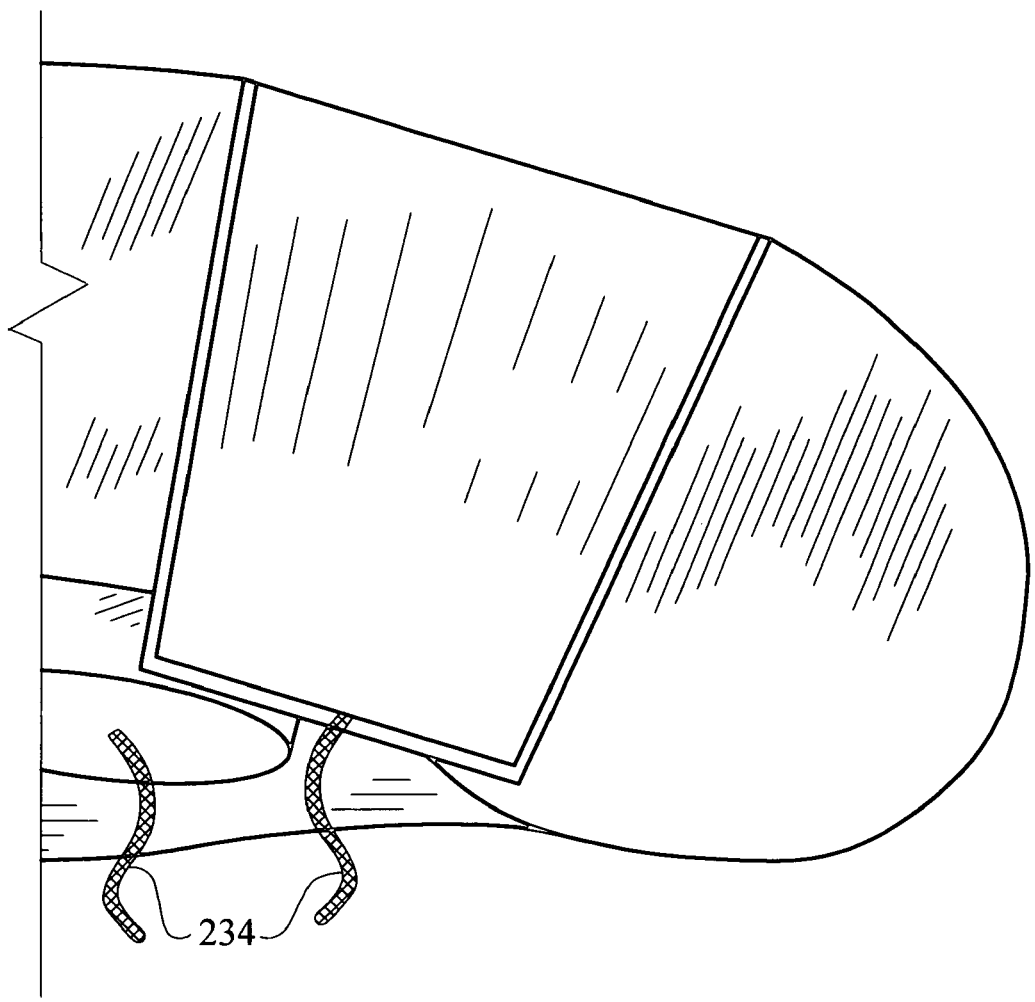
FIG. 10 shows an enlarged partial cross-section view of a plant mounting recess of the present invention, not to scale.

The plant mounting recess (200) is in fluid communication with the body of water (W) thereby supplying water to the plant housed in the recess (200). The plant mounting recess (200) is defined by at least one sidewall (210), as seen in FIGS. 3-6, and a bottom (220), as seen in FIGS. 6-9. It is the bottom (220) that is in fluid communication with the body of water (W), and more particularly, only a portion of bottom (220) is in fluid communication with the body of water (B). This fluid communication may be established by having only a portion of the bottom (220) physically in contact with the body of water (W), as seen in FIG. 4, or a portion of the bottom (220) may be in fluid communication with the body of water (W) via a wicking device (234), as seen in FIG. 10.

Figure 5:
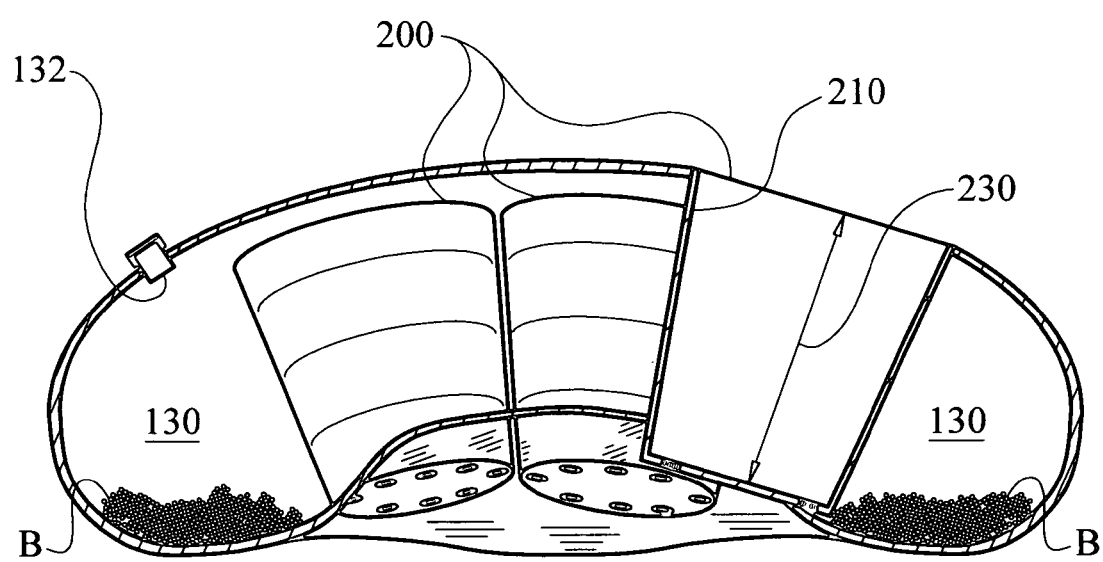
FIG. 5 shows one embodiment of a cross-section view of the present invention, floating in a body of water, taken along section line 3-3 in FIG. 1, not to scale.

In one particular embodiment, to ensure that only a portion of the bottom (220) of the plant mounting recess (200) is in contact with the body of water (W), the bottom (220) is positioned in a non-horizontal orientation, illustrated best in FIGS. 3 and 4. In one particular embodiment the bottom (220) forms an angle (A) between approximately five degrees and approximately forty-five degrees with the surface (WS) of the body of water (W) such that at only a portion of the bottom (220) is in fluid communication with the body of water, as seen in FIG. 9, thus not submerging the entire bottom (220). Furthermore, the plant mounting recess (200) has a depth (230) from the bottom (220) to the top of the plant mounting recess (200), as seen in FIG. 5.

In one embodiment, the garden device (10) has at least one fluid passageway (222) extending through the mounting recess bottom (220) such that the body of water (W) may fill the submerged portion of the mounting recess (200), as seen in FIGS. 4 and 9, thus supplying water to the plant. Obviously, in this embodiment the fluid passageway (222) is located on the portion of the bottom (220) that is submerged in the body of water (W) thereby allowing the body of water (W) to reach its own level within the mounting recess (200). In a further embodiment, the bottom (220) may also include at least one fluid passageway (222) located in the portion of the bottom (220) that is not submerged in the body of water (W), or that portion of the bottom (220) above the surface (WS) of the water of water. Having at least one fluid passageway (222) above the surface (WS) of the body of water (W) prevents the water level from rising above the level of the body of water (W). Such wetting of the mounting recess (200) above the water level may occur from natural precipitation, fountains, or the wicking, or capillary action, of the plant's soil. In essence, the at least one fluid passageway (222) located above the surface (WS) serves as an overflow weir ensuring that the mounting recess (200) does not become saturated above the level of this passageway (222).

In addition, the garden device (10) may also include at least one fluid passageway screen (223) covering the fluid passageway (222) to allow fluid transfer and substantially prevent the transfer of solids, as seen in FIG. 9. The screen (223) prevents the loss of potting soil, as well as entry of water insects into the mounting recess (200).

In an alternative embodiment, the garden device (10) may have a wicking device (224) attached to the mounting recess bottom (220) such that the wicking device (224) extends into the body of water and facilitates fluid communication between a portion of the mounting recess bottom (220) and the body of water, as seen in FIG. 10. The wicking device (224) allows the mounting recess (200) to remain physically outside the body of water (W), while still facilitating fluid communication and watering of the contents of the recess (200). While the wicking device (224) may be constructed of any number of materials, in one particular embodiment the wicking device (224) includes at least one layer of hydrophilic material.

In yet another embodiment, the plant mounting recess (200) may include an adjusting device (240) designed to be housed in the plant mounting recess (200), as seen in FIG. 9. The adjusting device (240) permits the user to adjust the depth (230), as seen in FIG. 5, of the mounting recess (200), as seen in FIG. 9, thereby changing how a plant is displayed and the watering characteristics. The adjusting device (240) may be as simple as a planar surface having flexible projections that mate with cooperating recesses in the sidewall (210).

The plant mounting recess (200) is generally sized to cooperate with a thin wall nursery plant container. A thin wall nursery plant container is a plant container with a diameter of 2 to 8 inches and a depth of 1¾ to 7 inches. The recess (200) is preferably sized to cooperate with the most commonly used thin wall nursery plant container for annuals. The plant mounting recess (200) may be formed in any number of shapes including, but not limited to, round, oval, square, rectangle, and diamond shaped containers. Alternatively, plants may be directly planted in the recess (200).

Figure 6:
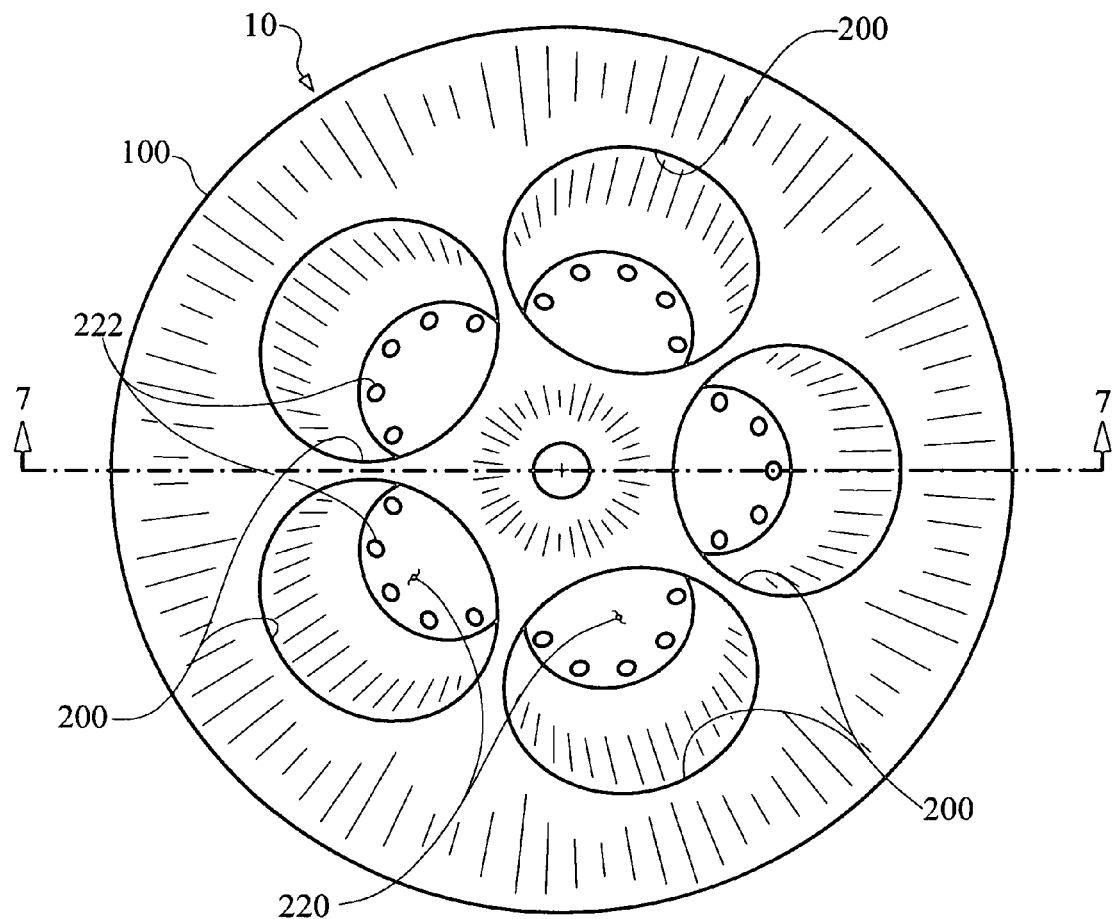
FIG. 6 shows a top plan view of the present invention, not to scale.
Figure 7:
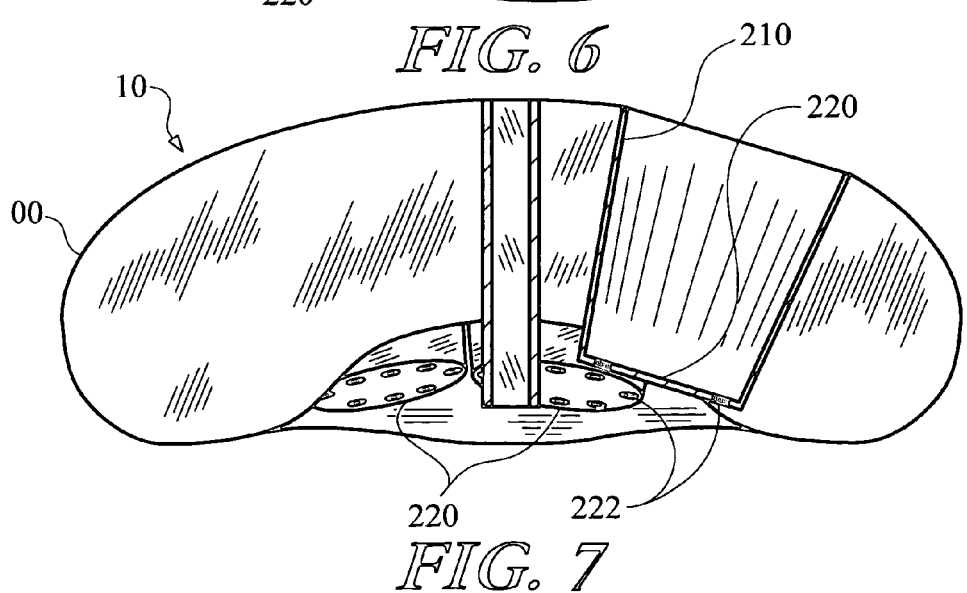
FIG. 7 shows one embodiment of a cross-section view of the present invention taken along section line 7-7 in FIG. 6, not to scale.

The floating garden device (10) may have multiple plant mounting recesses (200), in fact it is generally preferred to have the capability to display numerous plants on the same device (10). Additionally, the garden device (10) may incorporate a center recess in which an enhancement device may be mounted, as seen in FIGS. 6-8. Examples of enhancement devices include, but are not limited to: flags, solar powered lights, fountains, artificial flowers, fish feeders, algaecide dispensers, insect repellant devices.

In yet another embodiment, the buoyant body (100) may be formed to have at least one ballast chamber (130) and a chamber opening (132) located on the atmospheric contact portion (120) of the garden device (1), as seen in FIG. 5. The chamber opening (132) permits access to the ballast chamber (130) so that it may be filled with ballast material (B). By adding more ballast material (B) to the ballast chamber (130), the garden device (10) will ride lower in the body of water, which in some embodiments, increases the fluid communication with the non-horizontal plant mounting recess bottom (220).

Generally, the garden device (10) has maximum height (150) which is less than approximately one-half of the maximum width (140) in order to reduce the cross-sectional area of the garden device (10), as seen in FIG. 2. The reduction of the garden device's (10) cross sectional area helps keep the garden device (10) stationary and stable in windy conditions, thereby keeping the garden device (10) from being blown around the lake, or overturned. Additionally, the garden device (10) may include an anchoring system including a weight, or anchor, attached to a tether that is attached to the device (10). The anchoring system allows a user to position the device (10) in a predetermined location on a body of water and lower the weight into the body of water to ensure that the device (10) remains stationary.

The garden device (10) may be composed of plastic, wood, foam, buoyant concrete, or any other water-proof material capable of being made buoyant. The garden device (10) can be manufactured in any number of shapes, including, but not limited to, domes, pyramids, ovals, squares, and rectangular shapes. In addition, the garden device's (10) cross section may also vary with the shape of garden device (10).

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A floating garden device (10) for displaying and watering at least one living plant as the garden device (10) floats on a body of water (W), comprising:
   a buoyant body (100) having a fluid contact portion (110), in contact with the body of water (W), and a atmospheric contact portion (120), not in contact with the body of water (W), wherein the buoyant body (100) has a maximum width (140) and a maximum height (150); and
   at least one plant mounting recess (200) attached to the buoyant body (100), and having at least one sidewall (210), a bottom (220), and a depth (230) from the bottom (220) to the atmospheric contact portion (120), such that only a portion of the bottom (220) is in fluid communication with the body of water (W).

2. The garden device (10) of claim 1, wherein the mounting recess bottom (220) is non-horizontal such that only a portion of the bottom (220) is submerged in the body of water (W).

3. The garden device (10) of claim 2, further including at least one fluid passageway (222) extending through the mounting recess bottom (220) located on the portion of the bottom (220) that is submerged in the water (W) such that the body of water (W) may fill the submerged portion of the mounting recess (200).

4. The garden device (10) of claim 1, further including at least one fluid passageway (222) extending through the mounting recess bottom (220) located on the portion of the bottom (220) that is not submerged in the water (W) to facilitate drainage of the mounting recess (200) above the surface (WS) of the body of water (W).

5. The garden device (10) of claim 3, further including at least one fluid passageway screen (223) covering the fluid passageway (222) allowing fluid transfer and substantially blocking the transfer of solids.

6. The garden device (10) of claim 1, further including at least one recess adjusting device (240) designed to be housed in the plant mounting recess (200) and permit the user to adjust the depth (230) of the mounting recess (200).

7. The garden device (10) of claim 1, wherein the buoyant body (100) is formed to have at least one ballast chamber (130) having a chamber opening (132) located on the atmospheric contact portion (120) permitting access to the ballast chamber (130) so that it may be filled with ballast material (B).

8. The garden device (10) of claim 2, wherein the non-horizontal mounting recess bottom (220) forms an angle (A) between approximately five degrees and approximately forty-five degrees with the surface (WS) of the body of water (W).

9. The garden device (10) of claim 1, having at least three plant mounting recesses (200).

10. The garden device (10) of claim 1, further including at least one wicking device (224) attached to the mounting recess bottom (220) such that the wicking device (224) extends into the body of water (W) and facilitates fluid communication between the mounting recess bottom (220) and the body of water (W).

11. The garden device (10) of claim 10, wherein the wicking device (224) includes at least one layer of hydrophilic material.

12. The garden device (10) of claim 1, wherein the maximum height (150) is less than approximately one-half of the maximum width (140).

13. A floating garden device (10) for displaying and watering at least one living plant as the garden device (10) floats on a body of water (W), comprising:
   a buoyant body (100) having a fluid contact portion (110), in contact with the body of water (W), and a atmospheric contact portion (120), not in contact with the body of water (W), wherein the buoyant body (100) has a maximum width (140) and a maximum height (150); and
   at least one plant mounting recess (200) attached to the buoyant body (100), and having at least one sidewall (210), a bottom (220), and a depth (230) from the bottom (220) to the atmospheric contact portion (120), such that only a portion of the bottom (220) is in fluid communication with the body of water (W), wherein the mounting recess bottom (220) is non-horizontal such that only a portion of the bottom (220) is submerged in the body of water (W), and includes at least one fluid passageway (222) extending through the mounting recess bottom (220) located on the portion of the bottom (220) that is submerged in the water (W) such that the body of water (W) may fill the submerged portion of the mounting recess (200).

14. The garden device (10) of claim 13, further including at least one fluid passageway (222) extending through the mounting recess bottom (220) located on the portion of the bottom (220) that is not submerged in the water (W) to facilitate drainage of the mounting recess (200) above the surface (WS) of the body of water (W).

15. The garden device (10) of claim 13, further including at least one fluid passageway screen (223) covering the fluid passageway (222) allowing fluid transfer and substantially blocking the transfer of solids.

16. The garden device (10) of claim 13, wherein the buoyant body (100) is formed to have at least one ballast chamber (130) having a chamber opening (132) located on the atmospheric contact portion (120) permitting access to the ballast chamber (130) so that it may be filled with ballast material (B).

17. The garden device (10) of claim 13, wherein the plant mounting recess (200) is sized to cooperate with a thin wall nursery plant container.

18. The garden device (10) of claim 13, wherein the non-horizontal mounting recess bottom (220) forms an angle (A) between approximately five degrees and approximately forty-five degrees with the surface (WS) of the body of water (W).

19. The garden device (10) of claim 13, further including at least one hydrophilic wicking device (224) attached to the mounting recess bottom (220) such that the wicking device (224) extends into the body of water (W) and facilitates fluid communication between the mounting recess bottom (220) and the body of water (W).

20. A floating garden device (10) for displaying and watering at least one living plant as the garden device (10) floats on a body of water (W), comprising:

a buoyant body (100) having a fluid contact portion (110), in contact with the body of water (W), and a atmospheric contact portion (120), not in contact with the body of water (W), wherein the buoyant body (100) has a maximum width (140) and a maximum height (150); and at least one plant mounting recess (200) attached to the buoyant body (100), and having at least one sidewall (210), a bottom (220), and a depth (230) from the bottom (220) to the atmospheric contact portion (120), such that only a portion of the bottom (220) is in fluid communication with the body of water (W), wherein the mounting recess bottom (220) is angled between approximately five degrees and approximately forty-five degrees with the surface (WS) of the body of water (W) such that a portion of the bottom (220) is submerged in the body of water (W) and the submerged portion of the bottom includes at least one fluid passageway (222) extending through the submerged portion of the mounting recess bottom (220) such that the body of water (W) may fill the submerged portion of the mounting recess (200), and the portion of the bottom (220) that is not submerged including at least one fluid passageway (222) extending through the mounting recess bottom (220) to facilitate drainage of the mounting recess (200) above the surface (WS) of the body of water (W).

* * * * *